April 16, 1968   TOSHIO FUKUSHIMA   3,377,662
METAL MOLD HAVING VENT PLUG MEANS FOR SHAPING A PLASTIC
ARTICLE AND VULCANIZING A RUBBER ARTICLE
Filed April 14, 1966
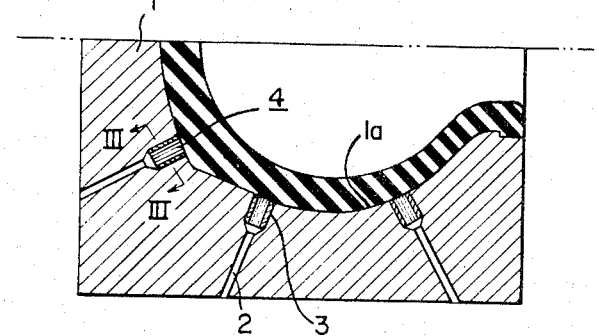
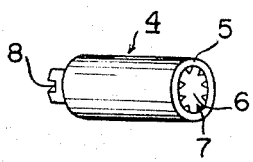 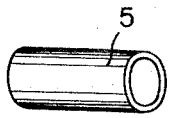 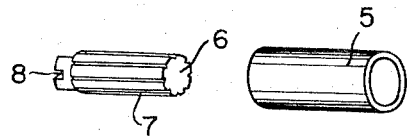
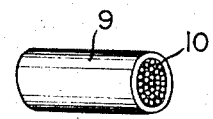 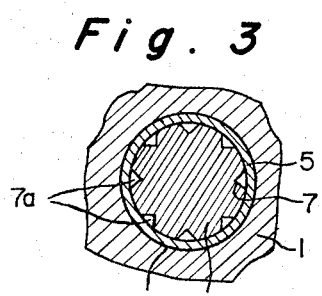
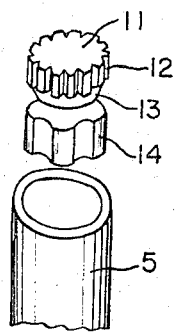
INVENTOR
*Toshio Fukushima*
BY *Stevens, Davis, Miller & Mosher*
ATTORNEY

United States Patent Office 3,377,662
Patented Apr. 16, 1968

3,377,662
METAL MOLD HAVING VENT PLUG MEANS FOR SHAPING A PLASTIC ARTICLE AND VULCANIZING A RUBBER ARTICLE
Toshio Fukushima, Tokyo, Japan, assignor to Bridgestone Tire Company Limited, Tokyo, Japan
Filed Apr. 14, 1966, Ser. No. 542,598
Claims priority, application Japan, Apr. 20, 1965, 40/22,925; Nov. 26, 1965, 40/72,355; Dec. 29, 1965, 40/80,841
5 Claims. (Cl. 18—38)

This invention relates to a metal mold for shaping a plastic article, such as an article made of rubber or synthetic resin, and for vulcanizing a rubber article.

In order to shape a plastic article made of for instance synthetic resins or to vulcanize a rubber article, such article has been heretofore shaped or vulcanized by using a metal mold by pressing it against the inner molding surface of a metal mold, and then if necessary, heated either from the outside or inside of the metal mold to obtain a desired shaped or vulcanized article. In the above process of shaping a plastic article or vulcanizing a rubber article by pressing the substance to be shaped or vulcanized against the molding surface of the metal mold, there have been often produced entrapped gas between said molding surface of the metal mold and said substance to be shaped or vulcanized, causing gaps between them to hamper the tight contact of said substance with said molding surface where such entrapped gas is produced, which can lead to a failure in producing the satisfactory desired surface configuration of the finished article.

In order to prevent formation of such entrapped gas between the molding surface of a metal mold and the substance to be shaped or vulcanized, it has been practiced to bore small vent holes in the metal mold so as to communicate the inside and outside thereof at those portions where such entrapped gas is apt to be generated and to exhaust the gas to the outside of the metal mold during the shaping or vulcanizing process. Such small vent holes bored through the metal mold are effective in eliminating entrapped gas, however, there is a disadvantage in that the plastic substance or rubber treated in such metal mold fills up the vent holes at least partially as if the vent holes were an integral part of the molding surface, and results in undesirable fine projections on the outer surface of the article thus shaped or vulcanized. Accordingly, with a metal mold having such small vent holes, it has been necessary to remove such undesirable projections manually or by means of a suitable device to finish the surface of the article into the desired smooth configuration.

Besides, if the plastic substance or rubber filling the vent holes are separated from the major portion of the shaped or vulcanized article in the metal mold and left in the vent holes after the removal of said article from the metal mold, then such holes are completely blocked up by the plastic substance or rubber thus left therein, and in the subsequent shaping or vulcanizing process, the entrapped gas may be generated again to result in an unsatisfactory surface configuration of the shaped or vulcanized article. Accordingly, it has been necessary in such metal molds to inspect the condition of such vent holes bored therethrough before and after each operation and to remove any remaining substances therein upon detection thereof.

It has been proposed to apply a porous plug made of sintered metallic substance to each vent hole at the molding surface of the metal mold in order to prevent such blocking of the vent hole, such as those proposed by Dunlop Rubber Company Limited. Such plugs are effective to prevent formation of undesirable fine projections on the surface of the shaped or vulcanized article while ensuring elimination of entrapped gas at least in the beginning of their use, however, as the plugs are used repeatedly, the fine holes of the porous substance of the plugs are also filled up by the substance to be shaped or vulcanized due to the complicated disposition of said fine holes, and it is extremely difficult to clean up the porous plugs for further service due to the same reason of the complicated disposition of fine holes, and accordingly such porous plugs have to be replaced with fresh plugs frequently, which results in an additional cost for the products. Thus, such plugs have been too expensive for practical applications.

In other words, even if small vent holes are bored in the metal mold to communicate the inside and the outside thereof or if a porous plug is applied to each of such small vent holes, there are still left such disadvantages as formation of undesirable small projections on the surface of the shaped or vulcanized article and blockage or stoppage of such vent holes, which prevents exhaustion of undesirable gaseous substance and causes entrapped gas between the inner molding surface of the metal mold and the plastic substance or rubber to be shaped or vulcanized, thus resulting in failure of forming the desired surface configuration of the finished article, whilst, retouching of the shaped or vulcanized article thus formed into a complete desired configuration requires additional labor and expenses or sometimes such retouching may not be possible at all, which means a considerable loss to the manufacturer.

Therefore, the principal object of the invention is to provide a metal mold for shaping plastic article and vulcanizing rubber article which obviates the aforementioned difficulties.

Another object of the invention is to provide a means to shape a plastic article and vulcanize a rubber article having perfect surface configuration without producing any undesirable projections thereon.

According to a preferred form of the invention, a plurality of small vent holes are bored through a metal mold for shaping a plastic article and vulcanizing rubber article so as to extend from the outside surface of the metal mold to the inner molding surface thereof to contact with the substance to be shaped or vulcanized, and a vent plug means comprising a sleeve member and a core member made of stainless substance and provided with at least one fine linear vent groove extending in parallel with the axial center line of said plug is fitted to each said small vent hole, thereby fine passageways are formed between said inner molding surface and the outside surface of the metal mold and the production of a perfect shaped or vulcanized article of the desired configuration is ensured without generating either undesirable projections on the finished surface of the article or entrapped gas between the molding surface of the metal mold and the material to be shaped or vulcanized, which may lead to incomplete shaping of the desired configuration.

Still another object of the invention is to provide a metal mold having a plurality of small vent holes communicating between the inside and outside surfaces thereof, which can be utilized repeatedly over at least a few thousand times.

Another object of the invention is to provide an easily cleansable vent plug means having fine gas passageways bored therethrough to eliminate the blockage of small vent holes bored through a metal mold by rust powder particles of said metal mold or by the material to be shaped or vulcanized in said metal mold.

For a better understanding of the invention, reference is taken to the accompanying drawings, in which:

FIG. 1 is a sectional view of a metal mold embodying the invention for shaping a pneumatic tire;

FIG. 2A is a perspective view of an embodiment of a vent plug means according to the invention;

FIGS. 2B and 2C are perspective views illustrating a core member and a sleeve member respectively of the vent plug means of FIG. 2A;

FIG. 3 is a partial enlarged transverse sectional view taken on the line III—III of FIG. 1;

FIG. 4 is a similar view to FIG. 2A, illustrating another embodiment of the vent plug means of the invention; and FIG. 5 is a partial exploded view illustrating still another embodiment of the vent plug means according to the invention.

Referring to FIG. 1 showing a metal mold for shaping a pneumatic tire in accordance with a preferred form of the principles of the invention, the reference numeral 1 designates the metal mold for shaping a tire, 1a the inner molding surface of the metal mold, and 2 small vent holes communicating between the molding surface 1a to the outside of the metal mold. An enlarged portion 3 is formed at the inner end of each vent hole 2 adjacent to the molding surface 1a to receive a vent plug means 4 according to the invention in a closely but replaceably fitted manner.

FIG. 2A shows an embodiment of the vent plug means 3 of the invention, which comprises a sleeve member 5 as shown in FIG. 2C and a core member 6 as shown in FIG. 2B. The outside surface of the core member 6 is adapted to fit closely but replaceably to the inner surface of the sleeve member 5. A plurality of small grooves 7 having a small depth in the radial direction, for instance 0.1 to 0.2 mm., are formed on the outer peripheral surface of the core member 6 in parallel with the longitudinal axial center line thereof. A leg 8 having a diameter smaller than the general diameter of the core member is secured to that end of the core member which is to be placed away from the molding surface 1a. In this particular embodiment, the outside diameter of the sleeve member is 10 mm. and the inner diameter 7 mm., but the invention is not limited to such dimensions of the sleeve member. It is apparent from FIGS. 2A to 2C that the plug means comprising the sleeve member 5 and the core member 6 thus assembled acts to provide fine passageways for elimination of entrapped gas.

To facilitate the mounting of the plug means 4 to each small vent hole 2, an expanded portion 3 is formed at the inner end of each hole 2 so that the depth thereof may be slightly shorter than the length of the sleeve member 5 while the diameter thereof may be substantially the same as that of the sleeve member 5. Then, a pre-assembled vent plug means 4 is inserted into the enlarged portion 3 thus formed, so that the vent plug means 4 may be rigidly secured to the metal mold by retaining the sleeve member 5 in tight contact with the inner surface of the enlarged portion 3 of the vent hole 2. Thereafter, that end portion of the vent plug means 4 which extends into the inside space of the metal mold 1 beyond the molding surface 1a is ground until said end portion becomes flush with the molding surface 1a.

It should be noted here that the sleeve member 5 can be mounted on the metal mold 1 without causing any damage on the core member 6 or without breaking any part of the fine grooves 7.

Referring to FIGS. 1 and 3, each vent plug means 4 thus mounted on the metal mold 1 acts to provide a passageway for gaseous substance extending from the molding surface 1a of the metal mold, through a plurality of fine gaps 7a formed between the fine grooves 7 of the core member 6 and the inner surface of the sleeve member 5 of the vent plug means 4 and the small vent hole 2, to the outside of the metal molding. Accordingly, in the process of shaping a plastic article or vulcanizing a rubber article, any gas entrapped between the molding surface 1a of the metal mold 1 and the substance to be shaped is exhausted to the outside of the metal mold through said passageways thus formed to eliminate incomplete formation of the desired configuration of the shaped or vulcanized article. Thus, a smooth and perfect surface of the shaped article is obtained while causing no undesirable projections thereon by applying the vent plug means 4 to each said vent passageway, and furthermore, the blockage of the vent holes by the material to be shaped or vulcanized is substantially eliminated.

According to the experiments carried out by the inventor, the vent plug means of the invention proved to be effective for about five thousand times of consecutive vulcanizing operations to obtain satisfactory vulcanized articles without any difficulty.

If the efficiency in gas passage through the passageway 7a is somehow reduced, the core member 6 can be easily removed from the sleeve member 5 for cleaning by pushing the leg 8 of the core member from the outside end of the vent hole 2 with a suitable tool toward the inside of the metal mold 1, and after being cleaned, the core member 6 can be fitted into the sleeve member 5 once again, thus most efficient operation of the metal mold can be always achieved.

It should be noted that both the sleeve member 5 and the core member 6 of the plug means of the invention are made of a stainless substance, such as aluminium alloys, copper alloys, stainless steels, synthetic resins, and the like, in order to avoid blockage of the gas passageway 7a with fine powdered particles of metal stains of the metal mold.

According to a feature of the invention, the blockage of the gas passageway 7a by rust particles of the metal mold 1 is entirely eliminated due to the fact that a stainless alloy sleeve is inserted between the core member 6 and the inner surface of the vent hole 2 of the metal mold. Thus, long life of such plug means is ensured and the need of frequent cleaning of the plug means is eliminated to produce satisfactory shaped or vulcanized articles having smooth surfaces.

This feature of the invention eliminating blockage of the small vent holes 2 is particularly important in view of the fact that metal molds are usually made of cast iron or cast steel which can rust to produce rust powder particles and the vent holes bored therein are often filled up by such rust powder particles, and it is normally unpractical to make such metal mold with stainless steel from the standpoint of the workability and cost. It has been noticed with conventional porous plugs as described hereinbefore that such rust powder particles are one of the most frequent causes of blockage of fine holes of such plugs and small vent holes. With the vent plug means 4 of the invention, such difficulties with the rust of the metal mold can be solved completely in a very simple and inexpensive manner.

FIG. 4 illustrates another form of the vent plug means to be used together with the metal mold of the invention, which comprises a sleeve member 9 and a bundle 10 of fine wires or tubes made of a stainless alloy or synthetic resin. In this particular embodiment shown in FIG. 4, the bundle 10 was made of fine elementary wires of 0.2 mm. dia., and the sleeve member 9 had an outside diameter of 10 mm. and an inside diameter of 6 mm., and after the bundle 10 of fine wires were inserted into the sleeve member 9, the sleeve 9 was compressed from the outside to tighten the fine wires thus inserted therein and produce a finished vent plug means.

FIG. 5 illustrates still another embodiment of the vent plug means to be used in the metal mold of the invention, which comprises a sleeve member 5 and a core member 11. The core member 11 in this embodiment has a head portion 12 of outside diameter of about 10 mm. having a plurality of fine grooves of 0.1 mm. deep extending in parallel with the longitudinal axial center line of the core, a neck portion 13 having a diameter smaller than that of the head portion 12, and a leg portion 14 having an outside diameter substantially the same with that of the head portion 11 and a plurality of grooves larger in size than but similar in disposition as said grooves on the head portion 12. The core member 11 shown in FIG. 5 can be placed in the sleeve member 5 and removed therefrom easier than that shown in FIGS. 2A to 2C due to the fact that the head portion 12 is short, while retaining substantially the same efficiency in exhausting entrapped gas from the space between the molding surface 1a and the material to be shaped.

As described in the foregoing, according to the invention, in the process of shaping a plastic article or vulcanizing a rubber article by using a metal mold, the complete exhaustion of entrapped gas between the mold surface of the metal mold and the material to be shaped or vulcanized is ensured by means of small vent holes bored in the metal mold and vent plug means inserted in said small vent holes, and at the same time the deposit of said material to be shaped or vulcanized in said small vent holes is completely eliminated, thereby a shaped or vulcanized article having perfectly smooth desired surface can be obtained. Therefore, the vent plug means of the invention to be applied to the small vent holes has an improved gas passage efficiency and accordingly, such vent plug means has an improved service life with less frequent cleaning operation.

What I claim is:

1. A metal mold for shaping a plastic article and vulcanizing a rubber article and having a plurality of gas vent means therein, comprising a plurality of small vent holes bored through the metal mold so as to extend from the inner molding surface thereof to the outer surface thereof, and a plurality of vent plug means fitted at the inner end of each said small vent hole, said vent plug means comprising a sleeve member made of stainless substance and a core member of stainless substance having a plurality of fine grooves disposed at least along the outer peripheral surface thereof in parallel with the longitudinal axial center line thereof, said core member being adapted to fit in said sleeve member tightly but replaceably in a coaxial manner so as to form a plurality of minute gas passageways at least between said grooves on the core member and the inner surface of said sleeve member, said sleeve member being fitted tightly in each said small vent hole, thereby a plurality of minute gas passageways are formed to communicate between the molding surface of the metal mold and the outer surface thereof.

2. A metal mold according to claim 1, wherein said core member consists of a bundle of stainless substance wires.

3. A metal mold according to claim 1, wherein said core member consists of a bundle of thin tubes of stainless substance.

4. A metal mold according to claim 1, wherein said core member is made of a stainless alloy and consists of a head portion having a plurality of comparatively small grooves extending in parallel with the axial center line of the core member, a neck portion having a reduced diameter, and a leg portion having a plurality of fine grooves larger than and in parallel with said grooves on the head portion.

5. A metal mold according to claim 1, wherein the depth of said minute gas passageway taken along transverse radial direction of the core member is no greater than 0.1 mm.

References Cited
UNITED STATES PATENTS

| | | | |
|---|---|---|---|
| 1,746,107 | 2/1930 | Mattia | 18—38 |
| 1,931,649 | 10/1933 | Eger. | |
| 2,581,939 | 1/1952 | Deist et al. | 18—38 X |
| 2,756,460 | 7/1956 | Heintz. | |
| 3,156,749 | 11/1964 | Hosfield. | |
| 3,160,928 | 12/1964 | Smillie. | |

FOREIGN PATENTS

| | | |
|---|---|---|
| 218,991 | 11/1958 | Australia. |
| 957,785 | 2/1957 | Germany. |

J. HOWARD FLINT, JR., *Primary Examiner.*